US008943633B2

(12) United States Patent
Soh et al.

(10) Patent No.: US 8,943,633 B2
(45) Date of Patent: Feb. 3, 2015

(54) CLEANING SYSTEM FOR CLEANING TUBING

(75) Inventors: Beng Kiat Soh, Singapore (SG); Yuen Liung Martinn Ho, Singapore (SG)

(73) Assignee: Hydroball Technics Holdings Pte Ltd, Singapore (SG)

( * ) Notice: Subject to any disclaimer, the term of this patent is extended or adjusted under 35 U.S.C. 154(b) by 772 days.

(21) Appl. No.: 13/143,153

(22) PCT Filed: Mar. 31, 2009

(86) PCT No.: PCT/SG2009/000113
§ 371 (c)(1),
(2), (4) Date: Aug. 17, 2011

(87) PCT Pub. No.: WO2010/114479
PCT Pub. Date: Oct. 7, 2010

(65) Prior Publication Data
US 2012/0012139 A1 Jan. 19, 2012

(51) Int. Cl.
F28G 1/12 (2006.01)
B08B 9/057 (2006.01)
(Continued)

(52) U.S. Cl.
CPC ............... *B08B 9/0551* (2013.01); *B08B 9/055* (2013.01); *F16L 55/46* (2013.01); *F28G 1/12* (2013.01)
USPC ............................................. 15/3.51; 165/95

(58) Field of Classification Search
USPC ............. 15/3.5, 3.51; 137/15.07, 268; 165/95
See application file for complete search history.

(56) References Cited

U.S. PATENT DOCUMENTS 2,222,516 A 11/1940 Powell et al.
3,215,195 A * 11/1965 Treplin ............................ 165/95
(Continued)

FOREIGN PATENT DOCUMENTS

CN 1169341 A 1/1998
CN 1650146 A 8/2005
(Continued)

OTHER PUBLICATIONS

Office Action for Chinese Application No. 200980156795.2; dated Feb. 22, 2013.
(Continued)

*Primary Examiner* — Mark Spisich
(74) *Attorney, Agent, or Firm* — Alston & Bird LLP

(57) ABSTRACT

According to one aspect of the invention, there is provided a cleaning system for cleaning tubing used for conducting a fluid therethrough, the tubing being connected between an inlet pipe and an outlet pipe, the cleaning system including: a receptacle; an apertured partition disposed within the receptacle and dividing the receptacle into a first compartment and a second compartment, at least one cleaning element disposed in the receptacle second compartment, wherein apertures of the apertured partition having a size allowing the fluid, but not the cleaning element to pass through the apertured partition; a fluid supply conduit connected to the receptacle first compartment for establishing fluid communication between the inlet pipe and the receptacle first compartment; a cleaning element supply conduit with a directional valve arranged therein, the cleaning element supply conduit being connected to the receptacle second compartment for establishing fluid communication between the receptacle second compartment and the inlet pipe, wherein the fluid supply conduit and the cleaning element supply conduit form a part of a fluid supply loop for supplying the cleaning element from the receptacle second compartment into the tubing via the inlet pipe; a cleaning element return conduit with a directional valve arranged therein, the cleaning element return conduit being connected to the receptacle second compartment for establishing fluid communication between the outlet pipe and the receptacle second compartment, a fluid return conduit connected to the receptacle first compartment for establishing fluid communication between the receptacle first compartment and the outlet pipe, wherein the cleaning element return conduit and the fluid return conduit form a part of a fluid return loop for returning the cleaning element from the tubing via the outlet pipe into the receptacle second compartment; and a valve arrangement operable to open/close the fluid supply loop and operable to open/close the fluid return loop.

16 Claims, 15 Drawing Sheets

(51) Int. Cl.
  *B08B 9/055* (2006.01)
  *F16L 55/46* (2006.01)

(56) References Cited

U.S. PATENT DOCUMENTS

| | | | |
|---|---|---|---|
| 3,882,931 A | | 5/1975 | Kumagai |
| 4,435,285 A | * | 3/1984 | Okouchi et al. ............... 209/250 |
| 4,554,965 A | * | 11/1985 | Bochinski et al. ............... 165/95 |
| 4,556,102 A | * | 12/1985 | Bochinski et al. ............... 165/95 |
| 4,865,121 A | * | 9/1989 | Ben-Dosa ........................ 165/95 |
| 5,060,333 A | | 10/1991 | Bersch |
| 5,176,204 A | * | 1/1993 | Ben-Dosa ........................ 165/95 |
| 5,447,193 A | * | 9/1995 | Peery ............................... 165/95 |
| 5,482,111 A | | 1/1996 | Bizard |
| 5,592,990 A | | 1/1997 | Ben-Dosa |
| 6,728,988 B2 | | 5/2004 | Chaffee et al. |
| 7,036,564 B2 | | 5/2006 | Soh |
| 7,975,758 B2 | * | 7/2011 | Ho ................................ 165/95 |

FOREIGN PATENT DOCUMENTS

| | | | |
|---|---|---|---|
| DE | 3131124 | * | 10/1982 |
| DE | 31 40 803 A1 | | 4/1983 |
| DE | 43 21 034 A1 | | 1/1995 |
| JP | 58-136998 | * | 8/1983 |
| JP | 3-28695 | * | 2/1991 |
| JP | 5-280890 | * | 10/1993 |
| JP | H-7-55389 A | | 2/1995 |
| JP | 11-44500 | * | 2/1999 |
| JP | H-11-37693 A | | 2/1999 |
| JP | H-11-230694 A | | 8/1999 |
| JP | 2001-272199 A | | 10/2001 |
| JP | 2002-81893 | * | 3/2002 |
| JP | 2005-528580 A | | 9/2005 |
| JP | 2006-84130 A | | 3/2006 |
| SG | 107766 | | 1/2005 |
| WO | WO-95/14205 A1 | | 5/1995 |
| WO | WO 02/055174 A1 | | 7/2002 |
| WO | 03/102487 | * | 12/2003 |
| WO | WO 03/102487 A1 | | 12/2003 |

OTHER PUBLICATIONS

Office Action for Japanese Application No. 2012-503376; dated May 28, 2013.

Search Report for European Application No. 09842789.1; dated Jul. 15, 2013.

* cited by examiner

Ball Receptacle

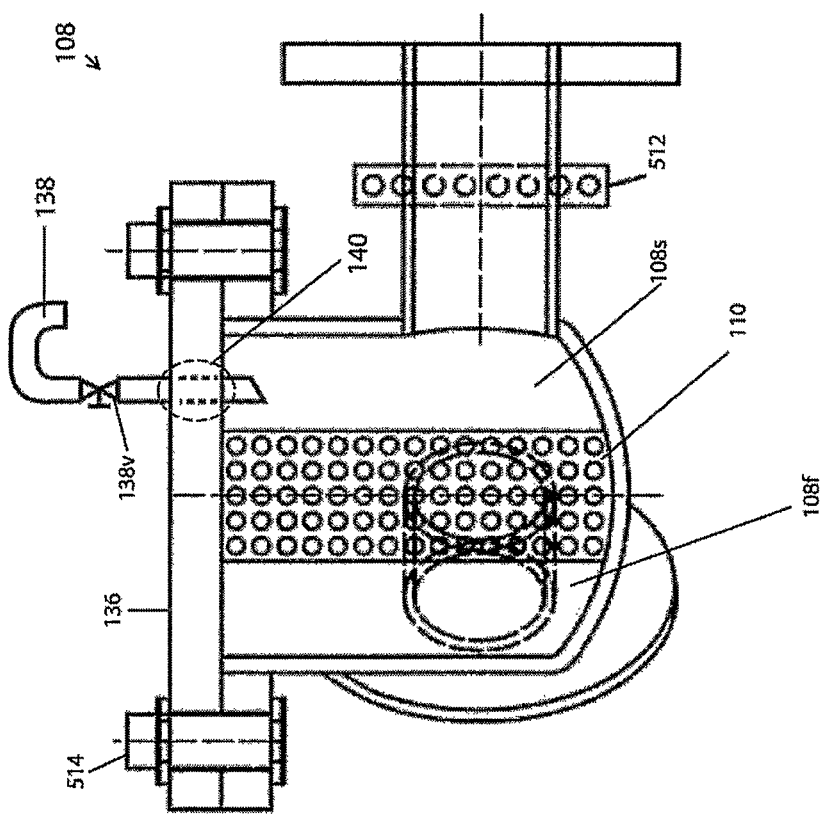

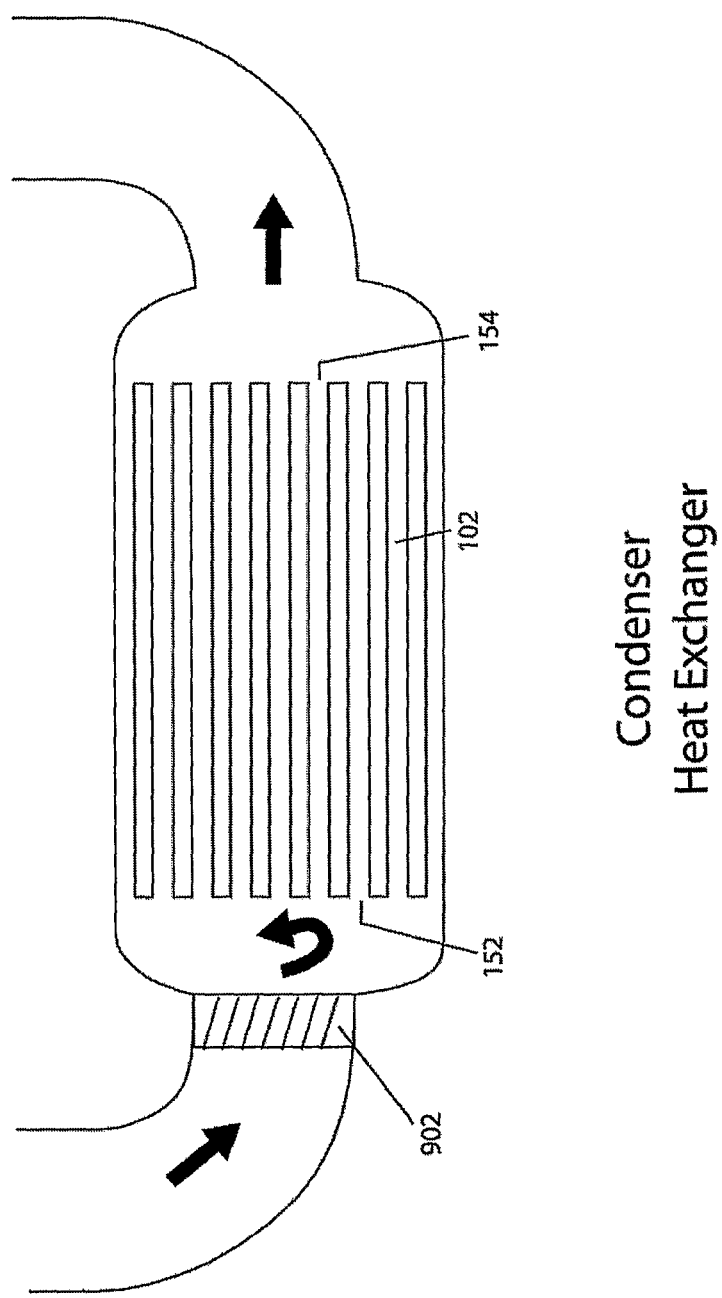

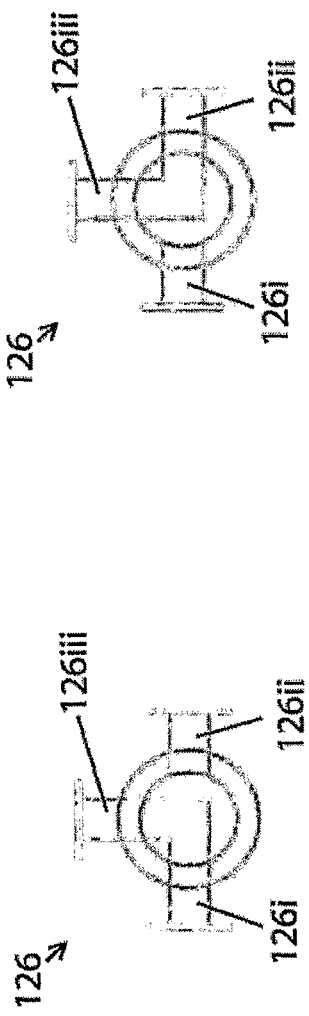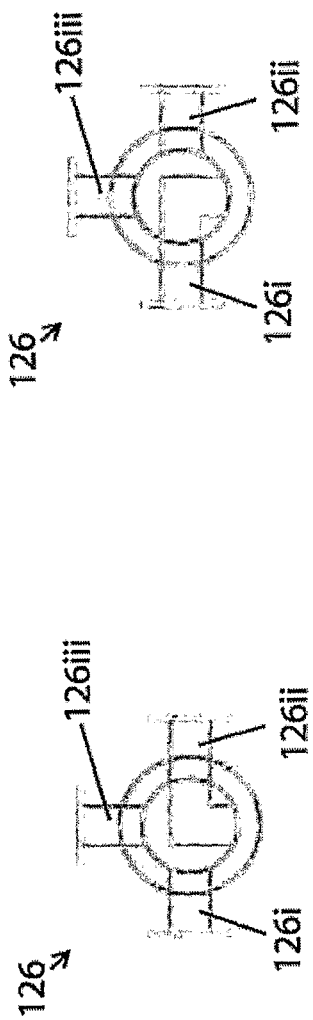
Figure 10A  Figure 10B
Figure 10C  Figure 10D
3 Way L-port valve sequence

CLEANING SYSTEM FOR CLEANING TUBING

FIELD OF THE INVENTION

The invention relates to a cleaning system for cleaning tubing.

BACKGROUND OF THE INVENTION

In heat exchanger systems such as a condenser, an evaporator or heater in an air-conditioning system, heating or cooling device for industrial applications, dirt or other unwanted deposits build up along the interior of the heat exchanger tubing.

One way of removing this dirt or other unwanted deposits is through the use of cleaning elements, such as balls made of rubber or spongy material or spherical objects with bristles made of nylon or metal. The cleaning elements rub against the interior wall of the heat exchanger tubing as they are transported via a fluid flowing along the heat exchanger tubing.

The cleaning elements are introduced into the heat exchanger system through a cleaning system. After the cleaning elements leave the heat exchanger tubing, they are returned to the cleaning system for recirculation into the heat exchanger tubing.

U.S. Pat. No. 5,592,990 discloses such a cleaning system. A cleaning ball receptacle for U.S. Pat. No. 5,592,990 uses a partition to divide the receptacle interior into a lower compartment and an upper compartment. Fluid is permitted to pass through the lower compartment, while keeping cleaning balls in the upper compartment. The receptacle has three passageways disposed in the upper compartment, where two of the passageways are used for fluid communication between the receptacle and an inlet pipe, while the third passageway is to allow fluid communication between the receptacle and the outlet pipe. The receptacle has a fourth passageway disposed in the lower compartment to drain fluid from the receptacle out into the atmosphere.

Singapore patent no. 107766 discloses another cleaning system. A cleaning ball receptacle for Singapore patent no. 107766 uses a partition to divide the receptacle interior into a lower compartment and an upper compartment. Fluid is permitted to pass through the lower compartment, while keeping cleaning balls in the upper compartment. The receptacle has three passageways disposed in the upper compartment, where two of the passageways are used for fluid communication between the receptacle and an inlet pipe, while the third passageway is to allow fluid communication between the receptacle and the outlet pipe. The receptacle has a fourth passageway disposed in the lower compartment that is in fluid communication with the outlet pipe.

The above two systems are complex in that a sequence of actions are needed to close and open valves located in their respective systems to facilitate recirculation of the cleaning balls, these valves being coupled between the receptacles and their respective inlet and outlet pipes. In addition, the four passageways on the receptacles of U.S. Pat. No. 5,592,990 and Singapore patent no. 107766 provide for a complicated receptacle design.

It would be advantageous to have a cleaning system with a simple architecture.

SUMMARY OF THE INVENTION

According to one aspect of the invention, there is provided a cleaning system for cleaning tubing used for conducting a fluid therethrough, the tubing being connected between an inlet pipe and an outlet pipe, the cleaning system including: a receptacle; an apertured partition disposed within the receptacle and dividing the receptacle into a first compartment and a second compartment, at least one cleaning element disposed in the receptacle second compartment, wherein apertures of the apertured partition having a size allowing the fluid, but not the cleaning element to pass through the apertured partition; a fluid supply conduit connected to the receptacle first compartment for establishing fluid communication between the inlet pipe and the receptacle first compartment; a cleaning element supply conduit with a directional valve arranged therein, the cleaning element supply conduit being connected to the receptacle second compartment for establishing fluid communication between the receptacle second compartment and the inlet pipe, wherein the fluid supply conduit and the cleaning element supply conduit form a part of a fluid supply loop for supplying the cleaning element from the receptacle second compartment into the tubing via the inlet pipe; a cleaning element return conduit with a directional valve arranged therein, the cleaning element return conduit being connected to the receptacle second compartment for establishing fluid communication between the outlet pipe and the receptacle second compartment, a fluid return conduit connected to the receptacle first compartment for establishing fluid communication between the receptacle first compartment and the outlet pipe, wherein the cleaning element return conduit and the fluid return conduit form a part of a fluid return loop for returning the cleaning element from the tubing via the outlet pipe into the receptacle second compartment; and a valve arrangement operable to open/close the fluid supply loop and operable to open/close the fluid return loop.

The valve arrangement may be a three way valve with three ports, wherein the receptacle first compartment, the fluid supply conduit and the fluid return conduit are each connected to a respective port of the three way valve, wherein the three way valve is also operable to close both the fluid supply conduit and the fluid return conduit simultaneously.

A controller may control operation of the valve arrangement.

The directional valves may be check valves.

Both the cleaning element supply conduit and the cleaning element return conduit may be coupled to the receptacle second compartment.

The apertured partition may extend generally vertically in the receptacle.

A pressure relief device may be coupled to an opening in an outer wall of the receptacle, the pressure relief device operable to release pressure from the receptacle.

The opening may be formed in a top of the outer wall of the receptacle, and the pressure relief device may include a valve coupled to the opening, the valve being operable to release trapped air pockets formed within the receptacle.

The pressure relief device may further include a tube extending from the pressure relief device through the opening in the receptacle side wall into the receptacle, with the tube free end arranged in close proximity to the interior surface of the top wall of the receptacle; and a valve may be coupled to the portion of the tube outside the receptacle, the valve being further operable to release trapped air pockets formed within the receptacle.

The tube free end may be tapered, wherein a plane defined by the tapered tube free end surface forms an angle of around 20 degrees to around 70 degrees relative to a longitudinal axis of the tube free end.

The opening may be in a part of the outer wall of the receptacle adjacent to the receptacle first compartment.

At least a portion of a top of an outer wall of the receptacle may be a transparent cover allowing view of an interior of the receptacle.

The transparent cover may be made of acrylic or tempered glass.

An inlet portion of the fluid return conduit connected to the receptacle first compartment may be misaligned relative to an outlet portion of the cleaning element return conduit connected to the receptacle second compartment.

A longitudinal axis of the inlet portion of the fluid return conduit may form an angle of around 90° to around 180° with a longitudinal axis of the outlet portion of the cleaning element return conduit.

The fluid return conduit and the cleaning element return conduit may be connected to the receptacle on opposite sides.

A maintenance valve may be arranged in the cleaning element supply conduit downstream of the cleaning element supply conduit directional valve; and a maintenance valve may be arranged in the cleaning element return conduit upstream of the cleaning element return conduit directional valve.

A maintenance valve may be arranged in the fluid supply conduit upstream of the valve arrangement; and a maintenance valve may be arranged in the fluid return conduit downstream of the valve arrangement.

The maintenance valves may be hand valves.

A cleaning element separator may be designed to be placed in the outlet pipe and collect the cleaning element therefrom, wherein the cleaning element separator may have apertures having a size allowing the fluid, but not the cleaning element to pass through the apertures, and is coupled to the cleaning element return conduit.

The end of the fluid supply conduit at the inlet pipe may be tapered, wherein a plane defined by the tapered end surface of the fluid supply conduit may form an angle of around 20 degrees to around 80 degrees relative to a longitudinal axis of the tapered end of the fluid supply conduit.

The end of the cleaning element supply conduit at the inlet pipe may be tapered, wherein a plane defined by the tapered end surface of the cleaning element supply conduit may form an angle of around 20 degrees to around 80 degrees relative to a longitudinal axis of the tapered end of the cleaning element supply conduit.

The end of the fluid return conduit at the outlet pipe may be tapered, wherein a plane defined by the tapered end surface of the fluid return conduit may form an angle of around 20 degrees to around 80 degrees relative to a longitudinal axis of the tapered end of the fluid return conduit.

A system may include a tubing with an inlet and an outlet; an inlet pipe connected to the tubing inlet; an outlet pipe connected to tubing outlet; and a cleaning system, wherein the fluid supply conduit and the cleaning element supply conduit are both coupled to the inlet pipe, the fluid supply conduit coupled at a position further upstream than the cleaning element supply conduit to provide a higher pressure at the fluid supply conduit than at the cleaning element supply conduit, wherein the cleaning element return conduit and the fluid return conduit are both coupled to the outlet pipe, the cross-sectional area of the outlet pipe portion where the cleaning element return conduit is coupled being larger than at the outlet pipe portion where the fluid return conduit is coupled to provide a higher pressure at the cleaning element return conduit than at the fluid return conduit, and wherein the cleaning element separator is within the outlet pipe portion with the larger cross-sectional area.

The tapered end of the fluid supply conduit and the tapered end of the cleaning element supply conduit may both be within the inlet pipe and the tapered end of the fluid return conduit is within the outlet pipe; and wherein the fluid supply conduit may be arranged so that the tapered end surface faces downstream fluid flow in the inlet pipe, the cleaning element supply conduit may be arranged so that the tapered end surface faces away from downstream fluid flow in the inlet pipe, and the fluid return conduit may be arranged so that the tapered end surface faces away from downstream fluid flow in the outlet pipe.

The tubing may be a heat exchanger.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 6A to 6C show cross-sectional views of a receptacle, according to one embodiment of the present invention, as seen from different perspectives.

FIG. 9 shows an example of a tubing to be cleaned using a cleaning system according to one embodiment of the present invention.

FIGS. 10A to 10D are schematic drawings of an operating position of a valve arrangement usable in a cleaning system according to one embodiment of the present invention.

DETAILED DESCRIPTION

While embodiments of the invention will be shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

It will be appreciated that common numerals, used in the relevant drawings, refer to components that serve a similar or the same purpose.

Figure 1:
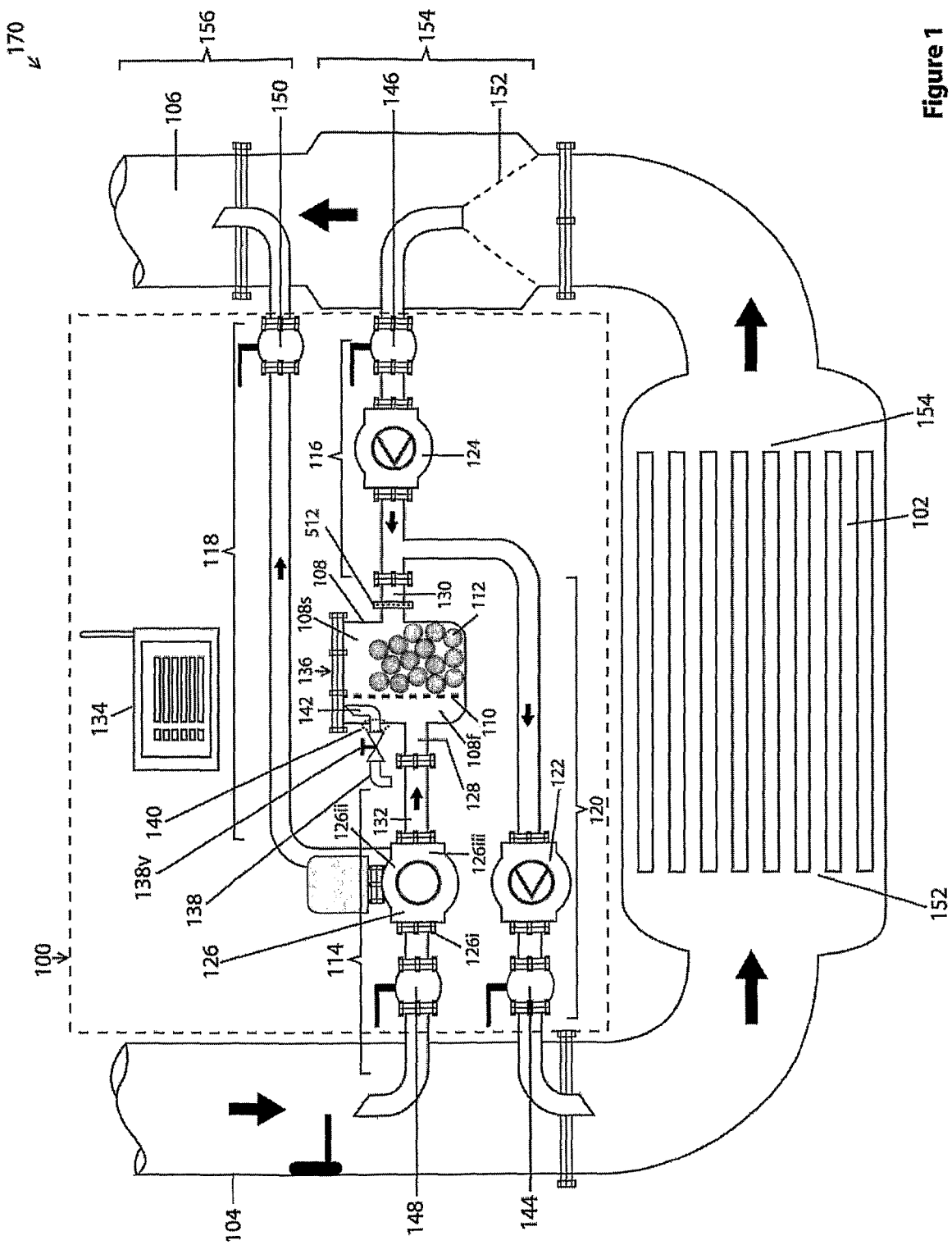
FIG. 1 is a schematic view of a cleaning system according to one embodiment of the present invention.

FIG. 1 is a schematic view of a cleaning system 100 according to one embodiment of the present invention.

One effect of the cleaning system 100 is that it provides a simple structure while at the same time enabling that has good self-cleaning capabilities.

The cleaning system 100 is for cleaning tubing 102 used for conducting a fluid therethrough. The tubing 102 is connected between an inlet pipe 104 and an outlet pipe 106.

The cleaning system 100 includes a receptacle 108. An apertured partition 110 is disposed within the receptacle 108 and divides the receptacle 108 into a first compartment 108*f* and a second compartment 108*s*.

At least one cleaning element 112 is disposed in the receptacle second compartment 108*s*. Apertures of the apertured partition 110 have a size allowing the fluid, but not the cleaning element 112 to pass through the apertured partition 110.

A fluid supply conduit 114 is connected to the receptacle first compartment 108*f* for establishing fluid communication between the inlet pipe 104 and the receptacle first compartment 108*f*.

A cleaning element supply conduit 120 is connected to the receptacle second compartment 108*s* for establishing fluid communication between the receptacle second compartment 108*s* and the inlet pipe 104. The cleaning element supply conduit 120 has a directional valve 122 arranged therein. The directional valve 122 allows flow of fluid in one direction, namely from the receptacle 108 into the inlet pipe 104. Thus, the directional valve 122 prevents the fluid in the inlet pipe 104 from flowing into the receptacle second compartment 108*s* through the cleaning element supply conduit 120.

Figure 2:
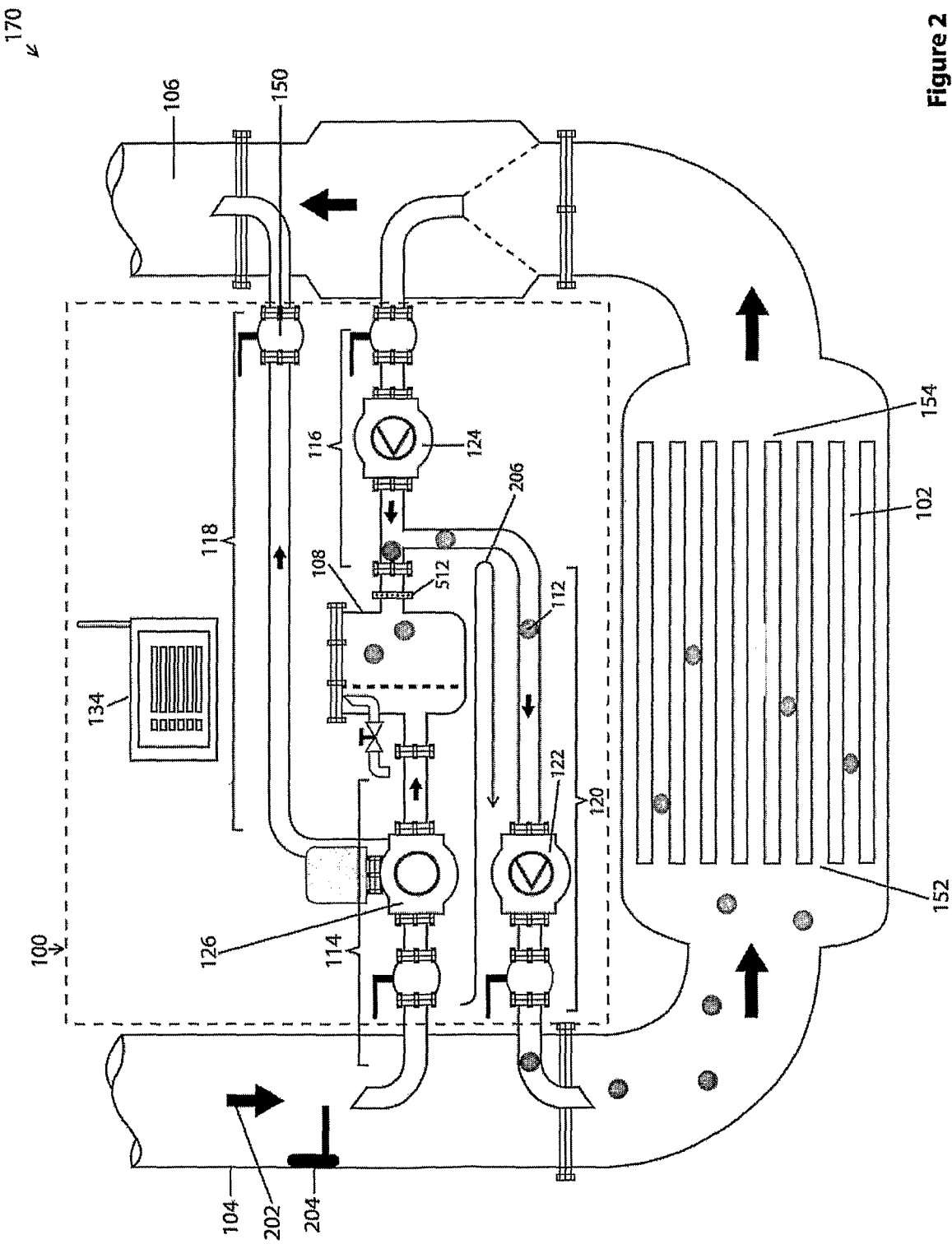
FIGS. 2 to 4 are schematic views of a cleaning system, according to one embodiment of the present invention, during different stages of a cleaning cycle.

During operation, the fluid supply conduit 114 and the cleaning element supply conduit 120 form a part of a fluid supply loop 206 (see FIG. 2) for supplying the cleaning element 112 from the receptacle second compartment 108*s* into the tubing 102 via the inlet pipe 104. It will be appreciated that the cleaning element 112 leaves the receptacle second compartment 108*s* via the cleaning element supply conduit 120 to enter into the inlet pipe 104.

A cleaning element return conduit 116 is connected to the receptacle second compartment 108*s* for establishing fluid communication between the outlet pipe 106 and the receptacle second compartment 108*s*. The cleaning element return conduit 116 has a directional valve 124 arranged therein. The directional valve 124 allows flow of fluid in one direction, namely from the outlet pipe 106 into the receptacle 108. Thus, the directional valve 124 prevents the fluid in the receptacle second compartment 108*s* from flowing into the outlet pipe 106 through the cleaning element return conduit 116.

A fluid return conduit 118 is connected to the receptacle first compartment 108*f* for establishing fluid communication between the receptacle first compartment 108*f* and the outlet pipe 106.

During operation, the cleaning element return conduit 116 and the fluid return conduit 118 form a part of a fluid return loop 406 (see FIG. 4) for returning the cleaning element 112 from the tubing 102 via the outlet pipe 106 into the receptacle second compartment 108*s*.

The fluid supply loop 206 (see FIG. 2) is formed by having the fluid flow from the fluid supply conduit 114 into the receptacle 108 (including the receptacle second compartment 108*s*) and then into the cleaning element supply conduit 120. The fluid return loop 406 (see FIG. 4) is formed by having the fluid flow from the cleaning element return conduit 116 into the receptacle 108 (including the receptacle second compartment 108*s*) and then into the fluid return conduit 118. Thus, from the perspective of the apertured partition 110, there is a two-way flow of fluid inside the receptacle 108. This two-way flow of fluid facilitates self cleaning of the apertured partition 110.

Figure 4:
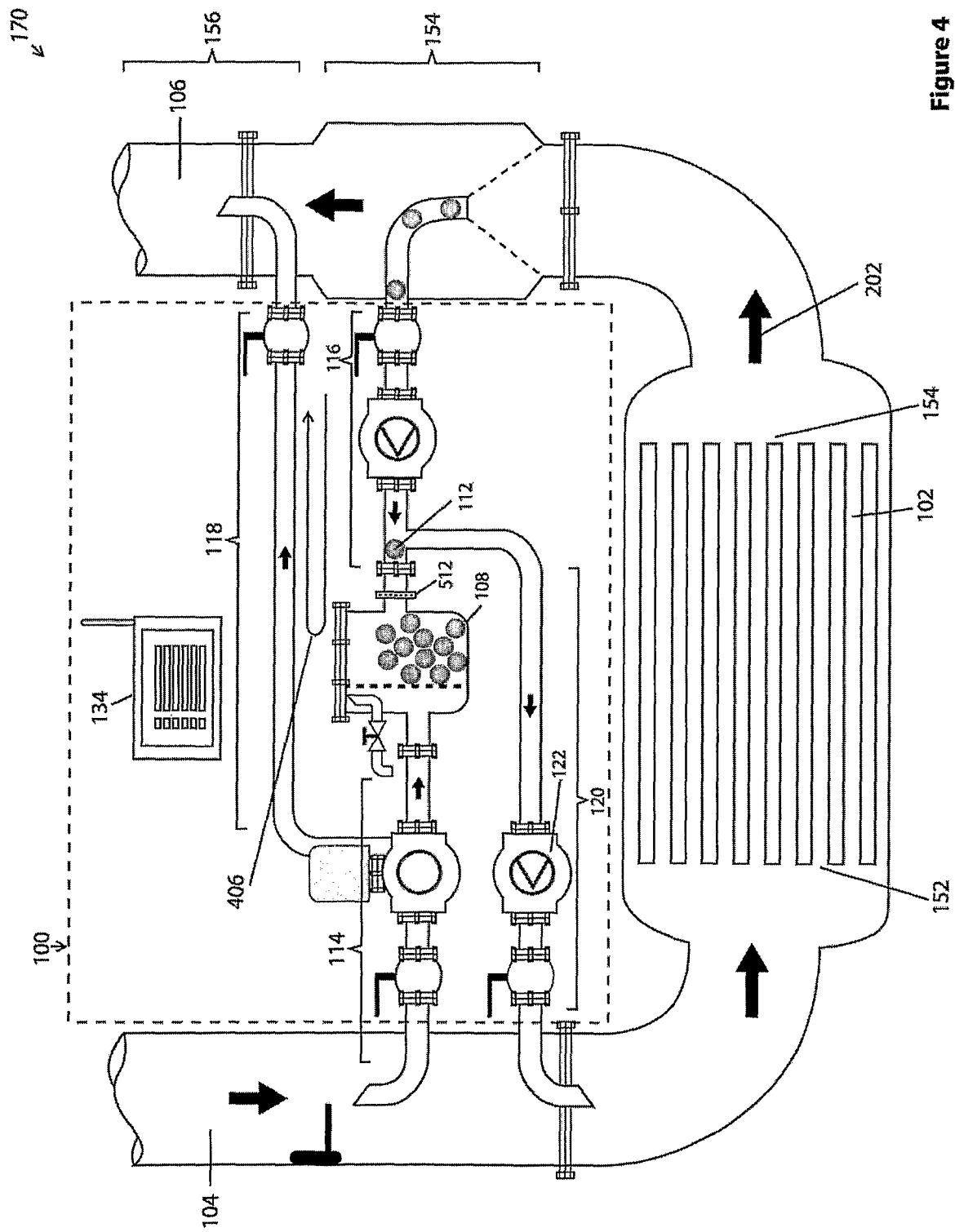

The cleaning system 100 further includes a valve arrangement 126 operable to open/close the fluid supply loop 206 (see FIG. 2) and operable to open/close the fluid return loop 406 (see FIG. 4).

The valve arrangement 126 has three modes of operation:
i) The fluid supply loop 206 (see FIG. 2) is opened, while the fluid return loop 406 (see FIG. 4) is closed. This is achieved by simultaneously opening the fluid supply conduit 114 and closing the fluid return conduit 118.
ii) The fluid supply loop 206 (see FIG. 2) is closed, while the fluid return loop 406 (see FIG. 4) is opened. This is achieved by simultaneously closing the fluid supply conduit 114 and opening the fluid return conduit 118.
iii) Both the fluid supply loop 206 (see FIG. 2) and the fluid return loop 406 (see FIG. 4) are closed. This is achieved by closing the fluid supply conduit 114 and closing the fluid return conduit 118.

The valve arrangement 126 is a three way valve with three ports (126*i*, 126*ii* and 126*iii*). The receptacle first compartment 108, the fluid supply conduit 114 and the fluid return conduit 118 are each connected to a respective port (126*iii*, 126*i* and 126*ii*) of the three way valve 126. The three way valve 126 is also operable to close both the fluid supply conduit 114 and the fluid return conduit 118 simultaneously. By simultaneously closing both the fluid supply conduit 114 and the fluid return conduit 118, both the fluid supply loop 206 (see FIG. 2) and the fluid return loop 406 (see FIG. 4) are closed.

Alternatively, as shown in FIG. 1, the receptacle first compartment 108*f* has a fluid connecting sleeve 128 for establishing a passageway for the fluid to pass into the receptacle first compartment 108*f*. The receptacle first compartment fluid connecting sleeve 128 is connected to the respective port 126*iii* of the three way valve 126 via a connecting conduit 132. The connecting conduit 132 is preferably aligned with the fluid connecting sleeve 128. It will be appreciated that two-way flow is experienced by the connecting conduit 132. When the fluid supply loop 206 (see FIG. 2) is established, the connecting conduit 132 becomes part of the fluid supply conduit 114. On the other hand, when the fluid return loop 406 (see FIG. 4) is established, the connecting conduit 132 becomes part of the fluid return conduit 118.

A motorized three-way L-port valve may be used for the three way valve 126. The use of a three way valve 126 provides the cleaning system 100 with a simple structure as the receptacle first compartment 108*f* will only need a single port (the fluid connecting sleeve 128) to interface with the three way valve 126. Further, only one valve (the three way valve 126) is needed to control the operation of the cleaning system 100.

Instead of using a three way valve, the valve arrangement 126 may be a single valve (not shown) arranged therein the fluid return conduit 118 and another single valve (not shown) arranged therein the fluid supply conduit 114. Both single valves would be operable to open or close their respective fluid conduits 118 and 114. By using single valves for the valve arrangement 126, both the fluid supply conduit 114 and the fluid return conduit 118 may be directly coupled (not shown) to the receptacle first compartment fluid connecting sleeve 128. The fluid supply conduit 114 may be aligned with the fluid connecting sleeve 128. It will also be appreciated that the fluid connecting sleeve 128 may be omitted from the receptacle first compartment 108*f*, in favour of coupling both the fluid return conduit 118 and the fluid supply conduit 114 directly to respective openings (not shown) in the receptacle first compartment.

A controller 134 controls operation of the valve arrangement 126. The controller 134 is wired to the valve arrangement 126 to control the operation of the valve arrangement 126. The controller 134 may send wireless signals to a remote server (not shown) for providing feedback to monitor the cleaning system 100.

The directional valves 122 and 124 may be check valves, which allow flow of fluid in only one direction.

Both the cleaning element supply conduit 120 and the cleaning element return conduit 116 are coupled to the receptacle second compartment 108.

Alternatively, as shown in FIG. 1, the receptacle second compartment 108s has a fluid connecting sleeve 130 for establishing a passageway for the fluid to pass into the receptacle second compartment 108s. Both the cleaning element supply conduit 120 and the cleaning element return conduit 116 are coupled to the fluid connecting sleeve 130. The cleaning element return conduit 116 may be aligned with the fluid connecting sleeve 130.

It will also be appreciated that the fluid connecting sleeve 130 may be omitted from the receptacle second compartment 108s, in favour of coupling both the cleaning element return conduit and the cleaning element supply conduit directly to respective openings in the receptacle second compartment.

It will be appreciated that having fewer ports on the receptacle 108 provides for a simpler structure. Thus, the receptacle 108 has a simple structure as there are only two ports (the fluid connecting sleeves 128 and 130). This simple structure still allows for the establishment of the fluid supply loop 206 (see FIG. 2) and the fluid return loop 406 (see FIG. 4), during operation of the cleaning system 100, to effect self-cleaning of the apertured partition 110. The simple structure provides savings in manufacturing costs, as manufacturing costs increases when more ports are formed in the receptacle 108.

The apertured partition 110 extends generally vertically in the receptacle 108. The generally vertical arrangement enhances self-cleaning of the apertured partition 110 by providing a surface which is substantially flush with the direction of fluid swirl inside the receptacle 108.

A pressure relief device 138 is coupled to an opening 140 in an outer wall of the receptacle 108. The pressure relief device 138 is operable to release pressure from the receptacle 108.

In performing maintenance work on the receptacle 108 (such as to replace the apertured partition 110 or replace the cleaning element 112), the pressure relief device 138 is operated so that the receptacle 108 interior equalises to atmospheric pressure. Otherwise, injuries may result from immediately opening the receptacle 108. Before operating the pressure relief device 138, maintenance valves 144, 146, 148 and 150 would first have to be closed to isolate the cleaning system 100.

Figure 5A:
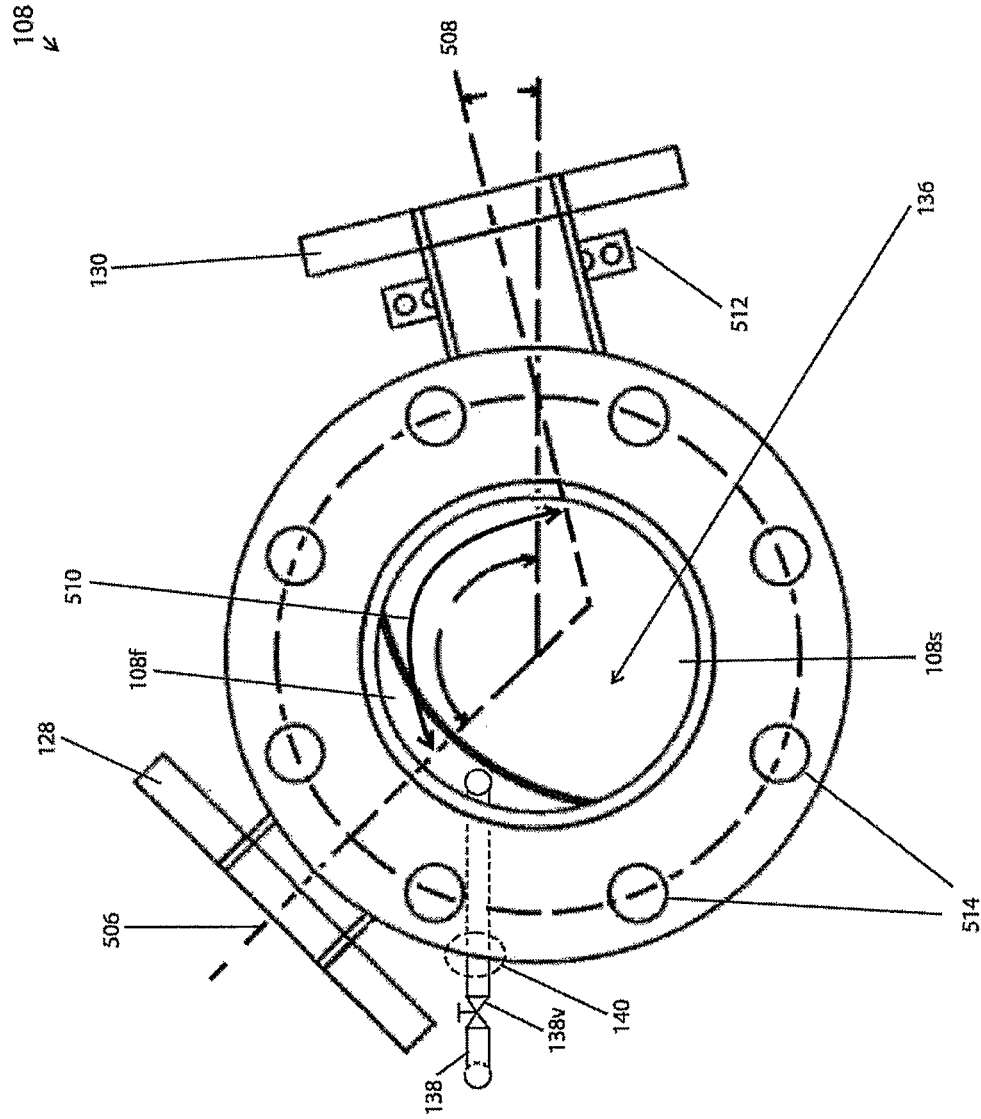
FIGS. 5A to 5C show top views of a receptacle according to one embodiment of the present invention.
Figure 5B:
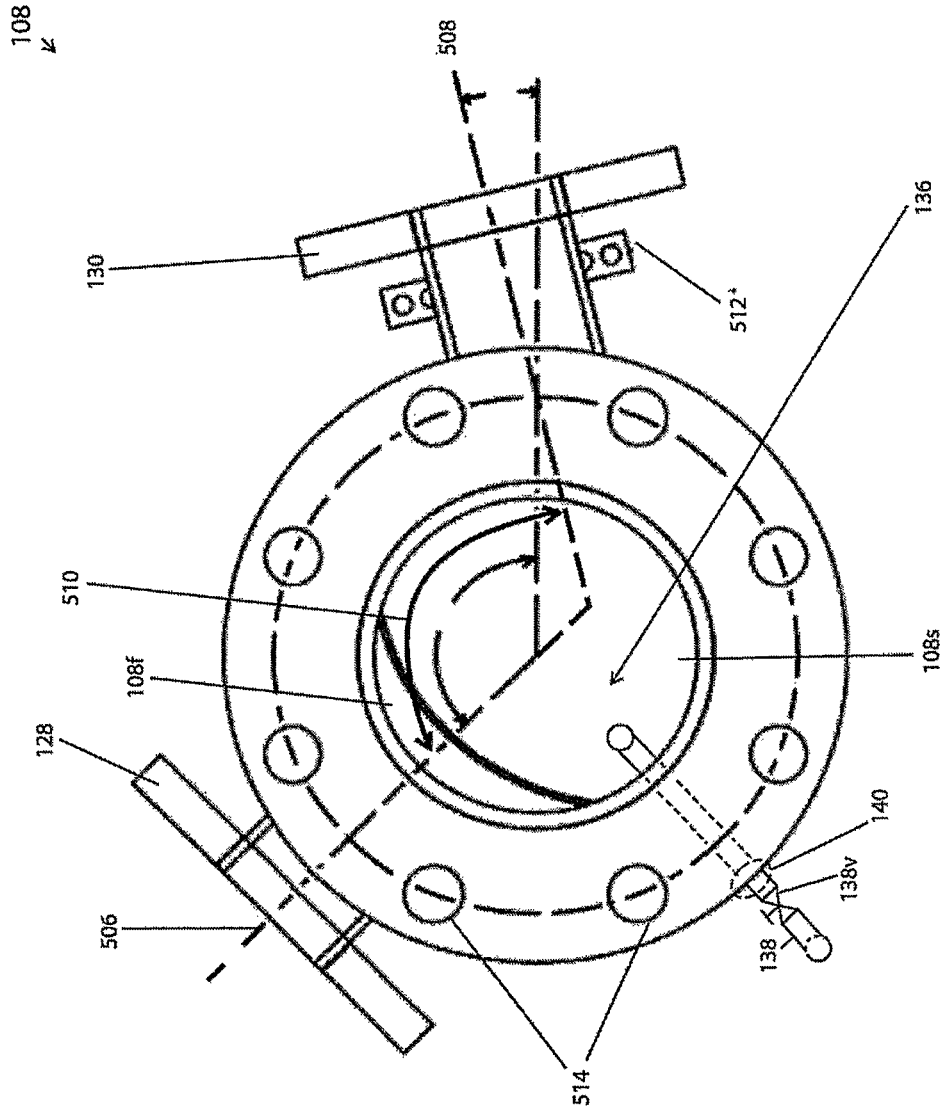
Figure 5C:
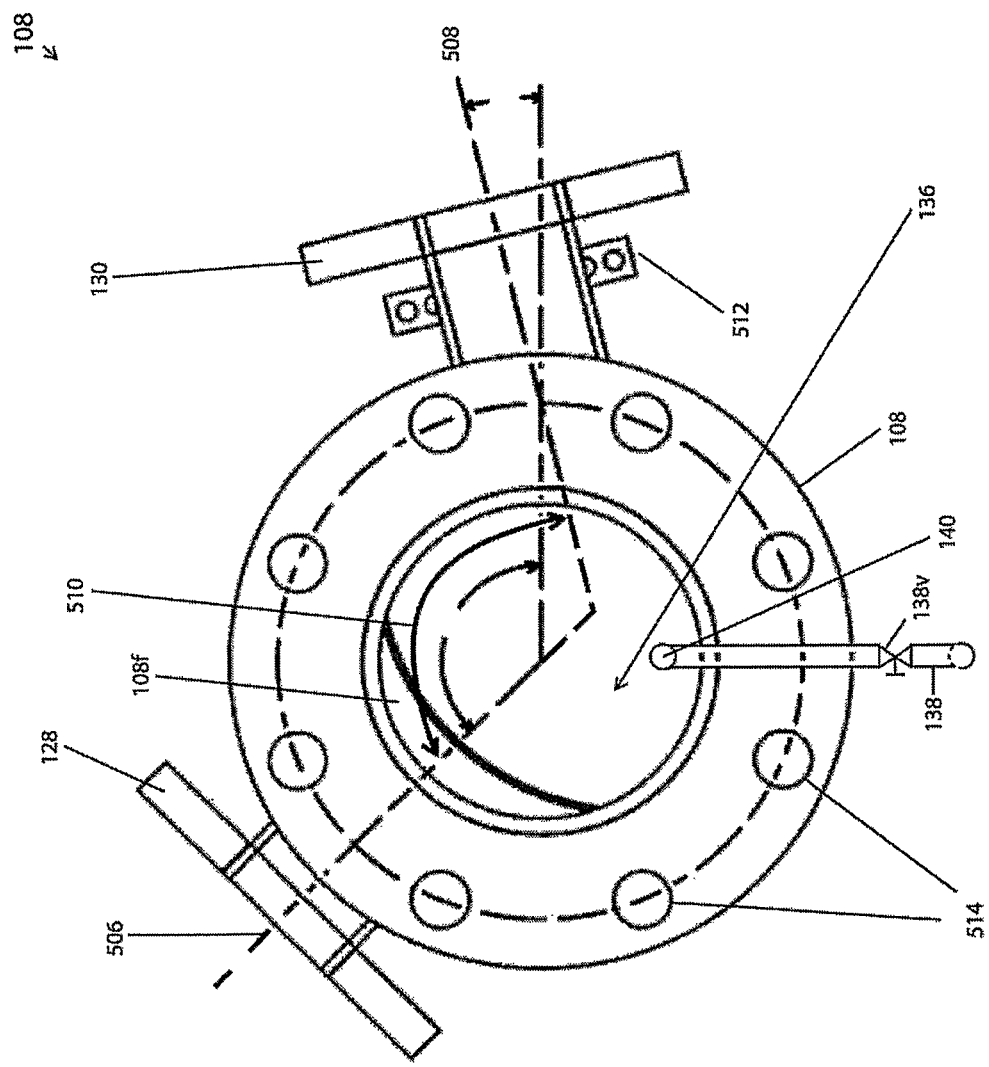

With reference to FIGS. 5C and 6C, the opening 140 may be formed in a top of the outer wall of the receptacle 108. The pressure relief device 138 may have a valve 138v coupled to the opening 140, the valve 138v being operable to release trapped air pockets formed within the receptacle 108.

Returning to FIG. 1, the pressure relief device 138 further includes a tube 142 extending from the pressure relief device 138 through the opening 140 in the receptacle 108 side wall into the receptacle 108. The tube 142 free end is arranged in close proximity to the interior surface of the top wall of the receptacle 108. A valve 138v is coupled to the portion of the tube 142 outside the receptacle 108, the valve 138v being further operable to release trapped air pockets formed within the receptacle 108.

When the valve 138v is operated to open the tube 142, a suction force is experienced from the tube 142 free end to outside the receptacle 108. This suction force will not only release trapped air pockets formed within the receptacle 108 during charging up of the cleaning system 100 with the fluid, but also attract the cleaning element 112 towards the tube 142 free end. The cleaning element 112, which is confined within the second compartment of the receptacle 108s, is prevented from blocking the tube 142 free end as the cleaning element 112 is too big to pass through the apertured partition 110. Preferably, the distance between the tube 142 free end and the interior surface of the top wall of the receptacle 108 is around 1 mm. Having the tube 142 free end close to the interior surface of the top wall of the receptacle 108 facilitates remove of air pockets when the receptacle 108 is full of the fluid from the charging up of the cleaning system 100.

To further enhance the speed at which air pockets are removed from the receptacle 108, the tube 142 free end may be tapered. A plane defined by the tapered tube free end surface forms an angle of around 20 degrees to around 70 degrees relative to a longitudinal axis of the tube free end.

While the opening 140 is illustrated to be in a part of the outer wall of the receptacle 108 adjacent to the receptacle first compartment 108f (also see FIGS. 5A and 6A), it will be appreciated that the opening 140 can also be in the outer wall (see FIGS. 5B and 6B) of the receptacle second compartment 108s. However, by locating the opening 140 in the outer wall of the receptacle first compartment 108f, the apertured partition 110 prevents the additional advantage of preventing the cleaning element 112 from blocking the portion (e.g. the tube 142 free end) of the pressure relief device 138 that is inside the receptacle first compartment 108f.

At least a portion of a top of an outer wall of the receptacle 108 is a transparent cover 136. The transparent cover 136 allows view of an interior of the receptacle 108. A user can inspect the condition of the cleaning element 112 through the transparent cover and determine whether the cleaning element 112 should be changed or more cleaning elements 112 should be introduced.

The transparent cover 136 may be made of acrylic or tempered glass and may be about 2 cm thick. Acrylic is suitable for use where the pressure inside the receptacle 108 is expected to be around 6 bars or less, where acrylic provides the advantage of not cracking or shattering when an opening 140 (see FIG. 5C) is formed by drilling through the transparent cover 136. Further, acrylic allows holes to be drilled near the circumference of the transparent cover 136 for bolts 514 (see FIGS. 5A to 5C) to pass through. The bolts 514 are used to fasten the transparent cover 136 onto the top of the receptacle 108. Tempered glass is able to withstand higher temperatures or pressures compared to acrylic. For instance, tempered glass may be used for the transparent cover 136 where the pressure inside the receptacle 108 is expected to be greater than 6 bars. However, when tempered glass is used, the opening should not be drilled in the transparent cover 136 as this could crack or shatter the glass. Instead, the tempered glass transparent cover 136 can be manufactured from a suitably shaped mould. The tempered glass transparent cover 136 may be mounted onto the top of the receptacle 108 by means of a circumferential device like a ring. The ring has holes allowing the bolts 514 to pass through to fasten the transparent cover 136 onto the top of the receptacle 108.

Figure 6A:
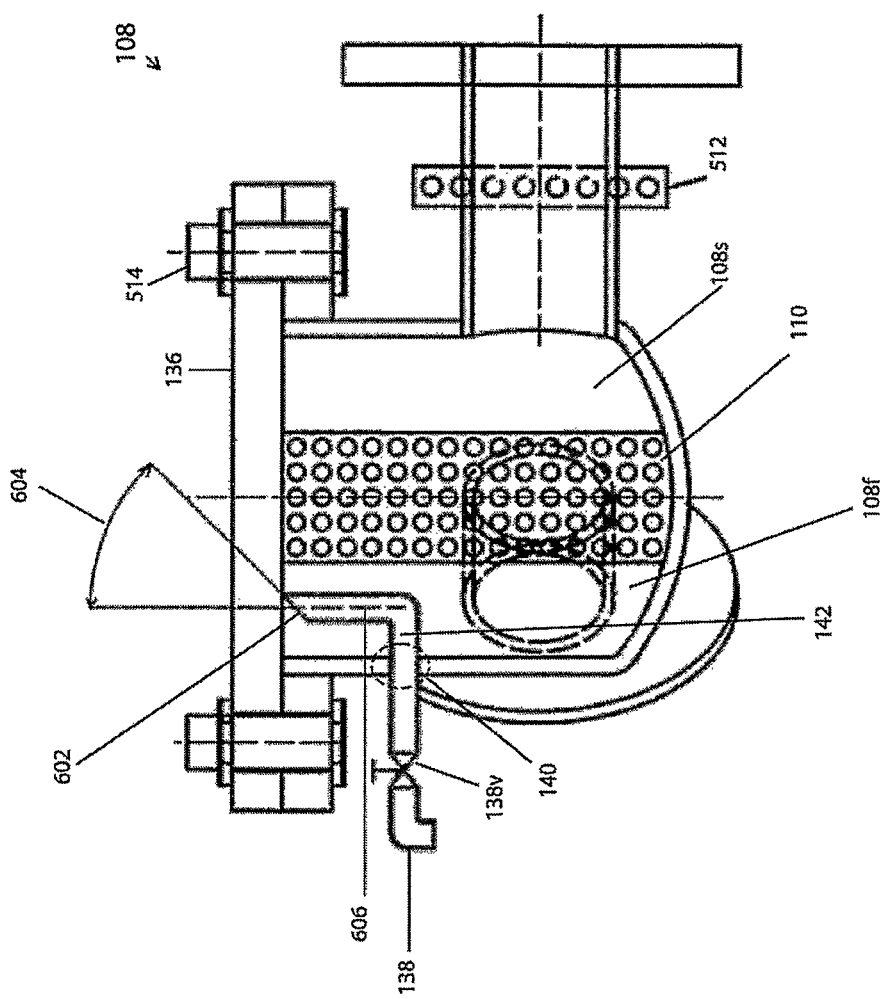
Figure 6B:
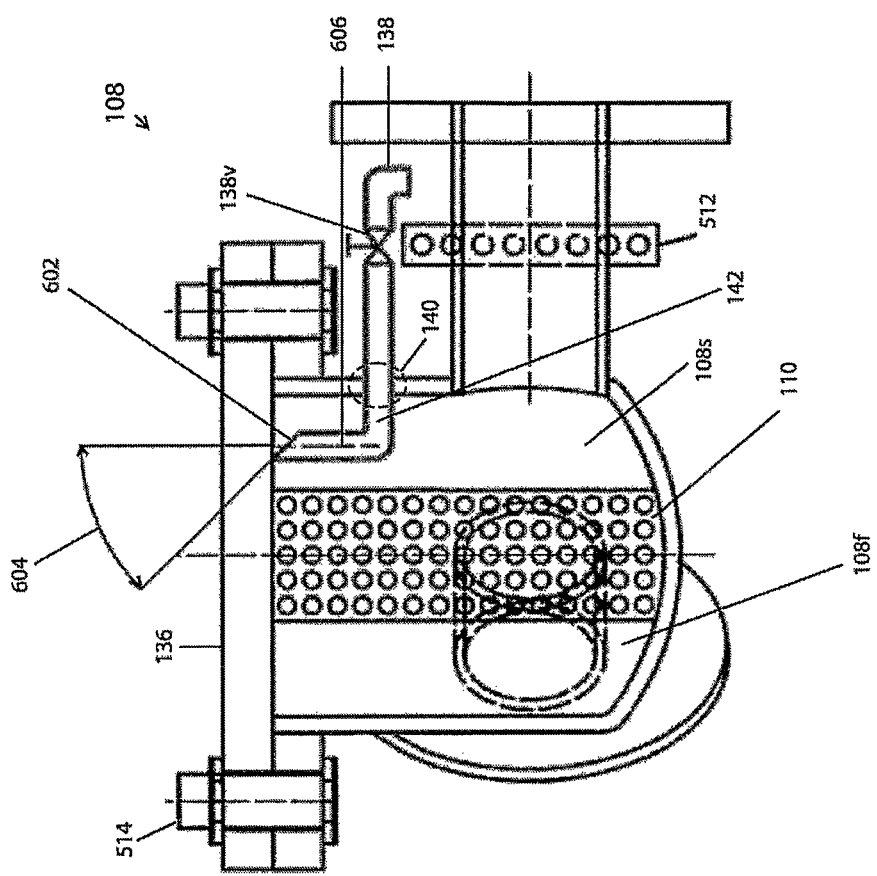

From FIG. 5C, it will be appreciated that the pressure relief device 138 is coupled to the opening 140 in the transparent cover 136.

Where the pressure inside the receptacle 108 is expected to be greater than 6 bars, the cleaning system 100 preferably only has one pressure relief device located at part of the outer wall adjacent to either the receptacle first compartment 108f (see FIGS. 5A and 6A) or the receptacle second compartment 108s (see FIGS. 5B and 6B). This avoids having to form the opening 140 in the transparent cover 136 (see FIG. 5C) for coupling a pressure relief device thereto, where the opening 140 may provide a point of weakness from which the transparent cover 136 may crack or shatter. Thus, by coupling the pressure relief device 138 to the opening 140 in the side wall of the receptacle 108, a transparent cover without an opening (see FIGS. 5A and 5B) formed therein may be used, which is less susceptible to cracking or shattering.

The receptacle first compartment fluid connecting sleeve 128 is misaligned relative to the receptacle second compartment fluid connecting sleeve 130. It was earlier mentioned (also see FIG. 1) that the fluid supply conduit 114 and the fluid return conduit 118 are coupled to the receptacle first compartment fluid connecting sleeve 128, while the cleaning element return conduit 116 and the cleaning element supply conduit 120 are coupled to the receptacle second compartment fluid connecting sleeve 130. Thus, an inlet portion of the fluid return conduit 118 connected to the receptacle first compartment 108f is misaligned relative to an outlet portion of the cleaning element return conduit 116 connected to the receptacle second compartment 108s. The misalignment creates a swirling effect (clockwise or anticlockwise) as fluid returns into the receptacle 108 from the cleaning element return conduit 116 and leaves the receptacle 108 via the fluid return conduit 118. This swirling effect dislodges dirt particles from the surface of the cleaning element 112 inside the receptacle 108, similar to how a washing machine works. It will also be appreciated that an outlet portion of the fluid supply conduit 114 may be misaligned relative to an inlet portion of the cleaning element supply conduit 120.

The inlet portion of the fluid return conduit 118 may be radially misaligned relative to the outlet portion of the cleaning element return conduit 116, which is best illustrated from FIG. 5. A longitudinal axis 506 of the inlet portion of the fluid return conduit 118 forms an angle 510 of around 90° to around 180° with a longitudinal axis 508 of the outlet portion of the cleaning element return conduit 116. The radial misalignment provides for a stronger swirling effect and therefore better dislodging of dirt particles from the surface of the cleaning element 112, compared to an arrangement whereby the longitudinal axis 506 of the inlet portion of the fluid return conduit 118 is aligned with the longitudinal axis 508 of the outlet portion of the cleaning element return conduit 116. From FIG. 5, it will be appreciated that the outlet portion of the fluid supply conduit 114 may be radially misaligned relative to the inlet portion of the cleaning element supply conduit 120.

Other misalignment orientations are possible. For instance, the fluid return conduit 118 and the cleaning element return conduit 116 may be connected to the receptacle 108 on opposite sides, so that there is vertical misalignment between the fluid return conduit 118 and the cleaning element return conduit 116. Similarly, the fluid supply conduit 114 and the cleaning element supply conduit 120 may be connected to the receptacle 108 on opposite sides, so that there is vertical misalignment between the fluid supply conduit 114 and the cleaning element supply conduit 120.

There may also not be any misalignment between the inlet portion of the fluid return conduit 118 and the outlet portion of the cleaning element return conduit 116. Similarly, there may also not be any misalignment between the outlet portion of the fluid supply conduit 114 and the inlet portion of the cleaning element supply conduit 120. The inlet portions of the fluid return conduit 118 and the cleaning element supply conduit 120 may be on a same plane as the outlet portions of the cleaning element return conduit 116 and the fluid supply conduit 114.

A maintenance valve 144 is arranged in the cleaning element supply conduit 120 downstream of the cleaning element supply conduit directional valve 122. Similarly, a maintenance valve 146 is arranged in the cleaning element return conduit 116 upstream of the cleaning element return conduit directional valve 124. By closing the maintenance valves 144 and 146 and operating the valve arrangement 126 to close both the fluid supply conduit 114 and the fluid return conduit 118, several components of the cleaning system 100 can be removed for maintenance. These components are the portion of the cleaning element supply conduit 120 upstream of the maintenance valve 144, the portion of the cleaning element return conduit 116 downstream of the maintenance valve 146 and the receptacle 108.

A maintenance valve 148 is arranged in the fluid supply conduit 114 upstream of the valve arrangement 126. Similarly, a maintenance valve 150 is arranged in the fluid return conduit 118 downstream of the valve arrangement 126. By closing the maintenance valves 144, 146, 148 and 150, several components of the cleaning system 100 can be removed for maintenance. These components are the portion of the fluid supply conduit 114 downstream of the maintenance valve 148, the valve arrangement 126, the portion of the fluid return conduit 118 upstream of the maintenance valve 146 and the receptacle 108.

The maintenance valves 144, 146, 148 and 150 may be hand valves.

A cleaning element separator 152 is designed to be placed in the outlet pipe 106 and collect the cleaning element 112 therefrom. The cleaning element separator 152 has apertures 702 (see FIG. 7) having a size allowing the fluid, but not the cleaning element 112 to pass through the apertures 702. The cleaning element separator 152 is coupled to the cleaning element return conduit 116.

The end of the fluid supply conduit 114 at the inlet pipe 104 is tapered. A plane defined by the tapered end surface of the fluid supply conduit 114 forms an angle of around 20 degrees to around 80 degrees relative to a longitudinal axis of the inlet pipe 104. The tapered end of the fluid supply conduit 114 improves the fluid flow rate into the fluid supply conduit 114.

The end of the cleaning element supply conduit 120 at the inlet pipe 104 is tapered. A plane defined by the tapered end surface of the cleaning element supply conduit 120 forms an angle of around 20 degrees to around 80 degrees relative to a longitudinal axis of the inlet pipe 104. The tapered end of the cleaning element supply conduit 120 improves the fluid flow rate out from the cleaning element supply conduit 120.

The end of the fluid return conduit 118 at the outlet pipe 106 is tapered. A plane defined by the tapered end surface of the fluid return conduit 118 forms an angle of around 20 degrees to around 80 degrees relative to a longitudinal axis of the outlet pipe 106. The tapered end of the fluid return conduit 118 improves the fluid flow rate out from the fluid return conduit 118.

The tubing 102 has an inlet 152 and an outlet 154. The inlet pipe 104 is connected to the tubing inlet 152 and the outlet pipe 106 is connected to the tubing outlet 154.

The fluid supply conduit 114 and the cleaning element supply conduit 120 are both coupled to the inlet pipe 104. The fluid supply conduit 114 is coupled at a position further upstream than the cleaning element supply conduit 120. This provides a higher pressure at the fluid supply conduit 114 than at the cleaning element supply conduit 120. When the valve arrangement 126 is operated to open the fluid supply conduit 114 and close the fluid return conduit 118, the higher pressure at the fluid supply conduit 114 causes the cleaning element 112 to leave the receptacle second compartment 108s to enter the cleaning element supply conduit 120 (see FIG. 2). The cleaning element 112 then enters the inlet pipe 104 from the cleaning element supply conduit 120 (see FIG. 3).

The cleaning element return conduit 116 and the fluid return conduit 118 are both coupled to the outlet pipe 106. The cross-sectional area of the outlet pipe portion 154 where the cleaning element return conduit 116 is coupled is larger than at the outlet pipe portion 156 where the fluid return conduit 118 is coupled. This provides a higher pressure at the cleaning element return conduit 116 than at the fluid return conduit 118. When the valve arrangement 126 is operated to close the fluid supply conduit 114 and open the fluid return conduit 118, the higher pressure at the cleaning element return conduit 116 causes the cleaning element 112 to leave the outlet pipe 106 (see FIG. 4) and enter the cleaning element return conduit 116. The cleaning element 112 then returns into the receptacle second compartment 108s via the cleaning element return conduit 116.

By providing an enlarged cross-sectional area at the outlet pipe portion 154, a faster flow rate is effected so that the cleaning element 112 takes a shorter time to return to the receptacle 108. It will be appreciated that the fluid return conduit 118 may be coupled at any point of the outlet pipe 106 which is downstream from the outlet pipe portion 154.

The cleaning element separator 152 is within the outlet pipe portion 154 with the larger cross-sectional area.

The tapered end of the fluid supply conduit 114 and the tapered end of the cleaning element supply conduit 120 are both within the inlet pipe 104. The tapered end of the fluid return conduit 118 is within the outlet pipe 106. The fluid supply conduit 114 is arranged so that the tapered end surface faces downstream fluid flow in the inlet pipe 104. The cleaning element supply conduit 120 is arranged so that the tapered end surface faces away from downstream fluid flow in the inlet pipe 104. The fluid return conduit 118 is arranged so that the tapered end surface faces away from downstream fluid flow in the outlet pipe 106.

From FIG. 1, it can be seen that there is a 90° elbow at the portion of the fluid return conduit 118 that is within the outlet pipe 106. It will be appreciated that the 90° elbow need not be present, whereby the fluid return conduit 118 is generally straight and perpendicularly connected to the outlet pipe 106. Similarly, there is a 90° elbow at a portion of the fluid supply conduit 114 that is within the inlet pipe 104 and a 90° elbow at a portion of the cleaning element supply conduit 120 that is within the inlet pipe 104.

The tubing 102 may be a heat exchanger. A heat exchanger may include condensers, evaporators and heaters in central air-conditioning systems.

Operation of a system 170 that includes the cleaning system 100 will be described with reference to FIGS. 1 to 4.

FIG. 1 shows the system 170 at the start of a cleaning cycle, where the cleaning element 112 is disposed in the receptacle second compartment 108s and where the valve arrangement 126 is operated to close the fluid supply conduit 114 and close the fluid return conduit 118.

At the start of the cleaning cycle (see FIG. 2), fluid 202 begins to flow down the inlet pipe 104. The flow of the fluid 202 is sensed by a flow switch 204. The flow switch 204 sends an activation signal to the controller 134, along with activation signals to other electrical components in the cleaning system 100. It will be appreciated that the flow switch 204 cuts off electrical supply to the controller 134, along with cutting off electrical supply to other electrical components in the cleaning system 100, when no fluid is flowing through the system 170.

The controller 134 activates the valve arrangement 126 to open the fluid supply conduit 114 and close the fluid return conduit 118. This allows the fluid 202 to flow from the inlet pipe 104 into the receptacle 108 via the fluid supply conduit 114. The directional valve 124 in the cleaning element return conduit 116 will prevent the fluid 202 from entering the outlet pipe 106 through the cleaning element return conduit 116, as the directional valve 124 is arranged to only allow fluid flow in the direction of the outlet pipe 106 towards the receptacle 108. Thus, the fluid 202 flow will carry the cleaning element 112 out of the receptacle second compartment 108s into the cleaning element supply conduit 120. Subsequently, the fluid 202 flow will carry the cleaning element 112 past the directional valve 122 of the cleaning element supply conduit 120 into the inlet pipe 104, where the cleaning element 112 will then move towards the tubing 102.

The cleaning element 112 is designed to be oversized compared to the diameter of each tube in the tubing 102. Thus, when the cleaning element 112 passes through the tubing 102, fouling deposits along the inner surfaces of the tubing 102 are scoured off.

Figure 3:
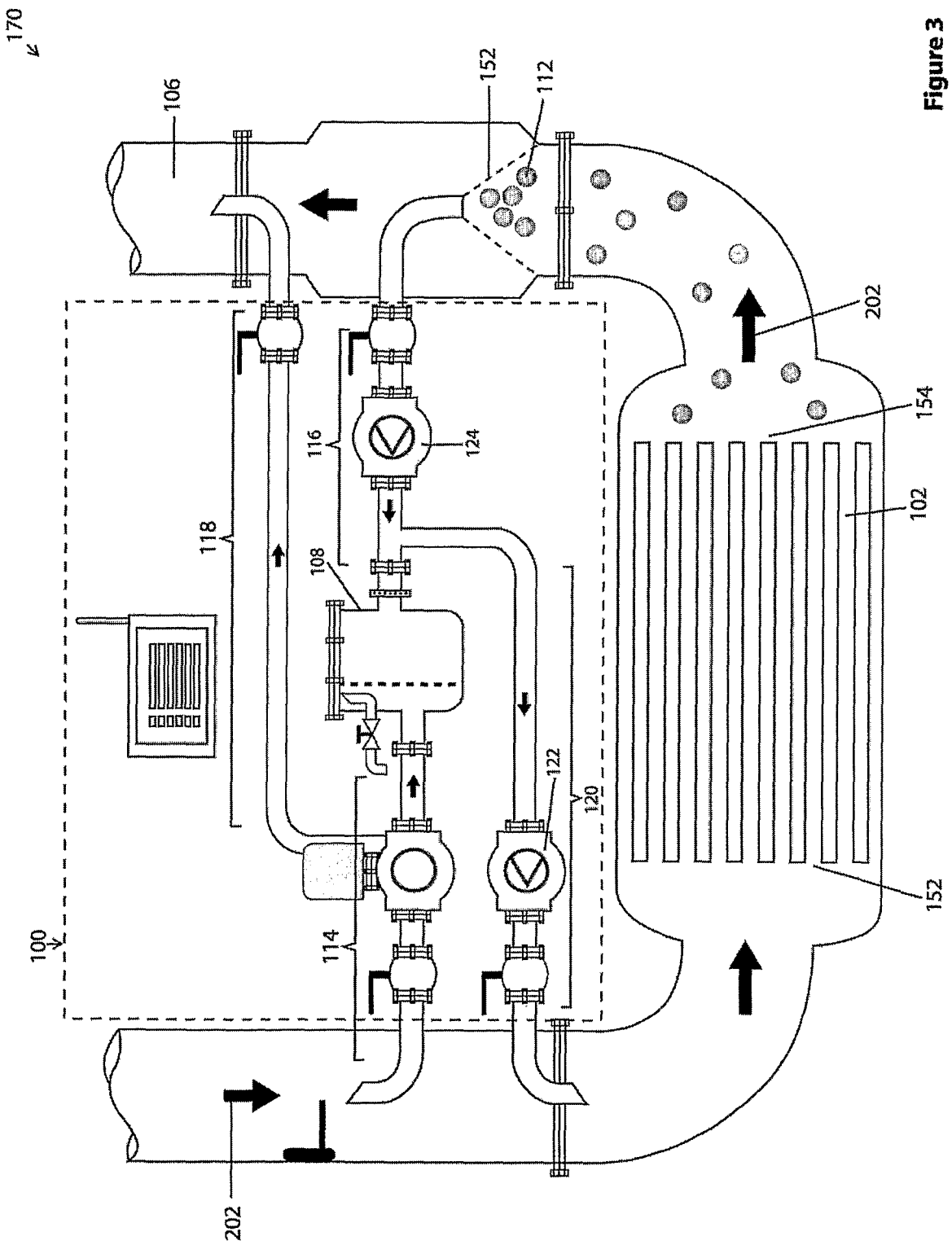

As illustrated in FIG. 3, after the cleaning element 112 leaves the tubing 102, the fluid flow 202 carries the cleaning element 112 towards the cleaning element separator 152. The cleaning element separator 152 prevents the cleaning element 112 from passing through as the apertures 702 (see FIG. 7) are sized smaller than the cleaning element 112, thereby allowing the fluid, but not the cleaning element to pass through the apertures 702. The cleaning element 112 will accumulate at the cleaning element separator 152 and is not able to enter the cleaning element return conduit 116. This is due to the establishment of the fluid supply loop 206 (see FIG. 2) brought about by the fluid supply conduit 114 being open and the fluid return conduit 118 being closed, thereby disrupting the fluid return loop 406 (see FIG. 4).

In FIG. 4, the controller 134 activates the valve arrangement 126 to close the fluid supply conduit 114 and open the fluid return conduit 118.

With the fluid supply conduit 114 closed and the fluid return conduit 118 opened, the pressure in the receptacle 108 will be lower than the pressure in the portion 154 of the outlet pipe 106 (due to the receptacle 108 being in fluid communication with the portion 156 of the outlet pipe 106 through the fluid return conduit 118). Thus, the cleaning element return conduit 116 provides a passage for the fluid 202 to carry the cleaning element 112 from the cleaning element separator 152 into the cleaning element return conduit 116 to return into the receptacle second compartment 108s. The fluid return conduit 118 provides a passage for the fluid 202 to return to the outlet pipe 106. The fluid 202 will not flow back into the inlet pipe 104 via the directional check valve 122 along the cleaning element supply conduit 120 as the pressure at the inlet pipe 104 is higher than the pressure at the outlet pipe 106, due to a drop of fluid pressure across the tubing 102.

The cleaning element 112 returning back inside the receptacle second compartment 108s marks the end of one cleaning cycle, where the cleaning element 112 remains in the receptacle 108 until the next cleaning cycle.

From the above, the cleaning cycle does not require use of an additional power source, such as from motorized pumps or air compressors to circulate the cleaning element 112 through the tubing 102. Thus, the cleaning system 100 is non-powered. The automatic rinsing of the cleaning element 112 inside the receptacle 108 to remove dirt prolongs the durability and effectiveness of the sponge balls. Further, it will be appreciated that during the cleaning cycle, fluid from the outlet pipe 106 does not return to the inlet pipe 104. This improves the cooling efficiency of the cleaning system 100 in the scenario where the tubing 102 is a heat condenser, as warm fluid in the outlet pipe 106 is prevented from mixing with cool fluid in the inlet pipe 104.

FIGS. 5A to 5C show top views of the receptacle 108 of FIG. 1.

The receptacle 108 has a curtain-beam sensor 512 (also see FIGS. 1 to 4) disposed anywhere along the fluid connecting sleeve 130 to before the point where the cleaning element return conduit 116 and the cleaning element supply conduit 120 are connected (see FIGS. 1 to 4). The curtain-beam sensor 512 detects movement, size, number and colour of the cleaning element 112, for monitoring the condition of the cleaning element 112. From the data provided by the curtain-beam sensor 512, it can be deduced whether the cleaning element 112 needs to be replaced.

FIGS. 6A to 6C show cross-sectional views of the receptacle 108 of FIG. 1, as seen from different perspectives.

From FIGS. 6A and 6B, it can be seen that the free end 602 of the tube 142 is arranged in close proximity to the interior surface of the top wall of the receptacle 108. As earlier mentioned, the tube free end 602 is tapered. The angle 604 of taper of around 20 degrees to around 70 degrees, relative to the longitudinal axis 606 of the tube free end 602, can also be seen from FIGS. 6A and 6B.

FIG. 6C shows the pressure relief device 138 being connected to the opening 140 formed in the top of the receptacle 108. The pressure relief device 138 is operated by opening the valve 138v.

Figure 7:
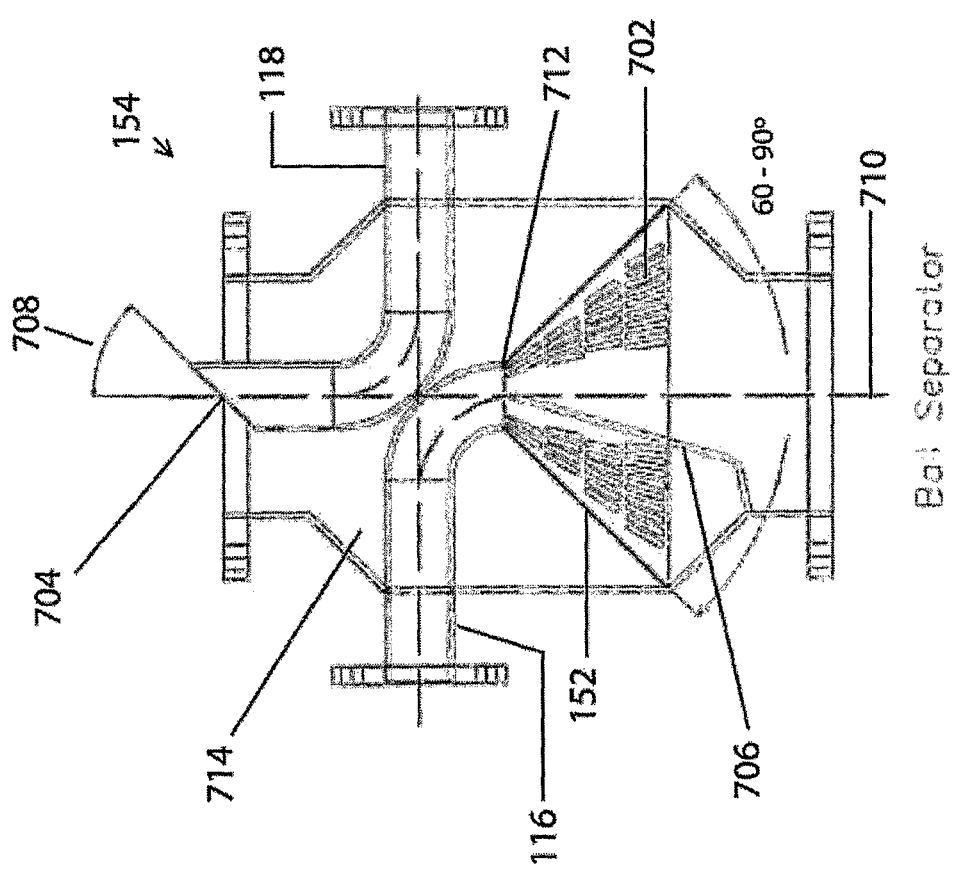
FIG. 7 shows a cross-sectional view of an outlet pipe portion according to one embodiment of the present invention.

FIG. 7 shows a cross-sectional view of the outlet pipe portion 154 (i.e. the portion of the outlet pipe 106 with the enlarged cross-sectional area) of the system 170 of FIG. 1.

From FIG. 7, it will be appreciated that the cleaning element separator 152 is designed to fit against the interior wall of the outlet pipe portion 154. FIG. 7 also illustrates how the end 704 of the fluid return conduit 118 is tapered. As earlier mentioned, the angle 708 of taper is around 20 degrees to around 80 degrees, relative to the longitudinal axis 710 of the outlet pipe 106 (see FIG. 1). FIG. 7 also illustrates how the fluid return conduit 118 is arranged so that the tapered end surface 704 faces away from downstream fluid flow in the outlet pipe 106.

A transparent panel 714 (such as a viewing glass) is located at outlet pipe portion 154. The transparent panel 714 allows visual monitoring of the cleaning element 112.

The cleaning element 112 may clump at the cleaning element separator 152, thereby blocking the entrance 712 of the cleaning element return conduit 116. The clumping may be prevented through the use of a protrusion 706 that is coupled at one end to the interior wall of the outlet pipe portion 154, while having an opposite end positioned adjacent to the entrance 712 of the cleaning element return conduit 116. The protrusion 706 vibrates due to the turbulent flow of the fluid through the cleaning element separator 152. Thus, the protrusion 706 acts as a non-motorised vibrating device. The non-motorised vibrating device 706 agitates the cleaning element 112 at the cleaning element separator 152, thereby preventing blockage at the entrance 712 of the cleaning element return conduit 116.

Figure 8:
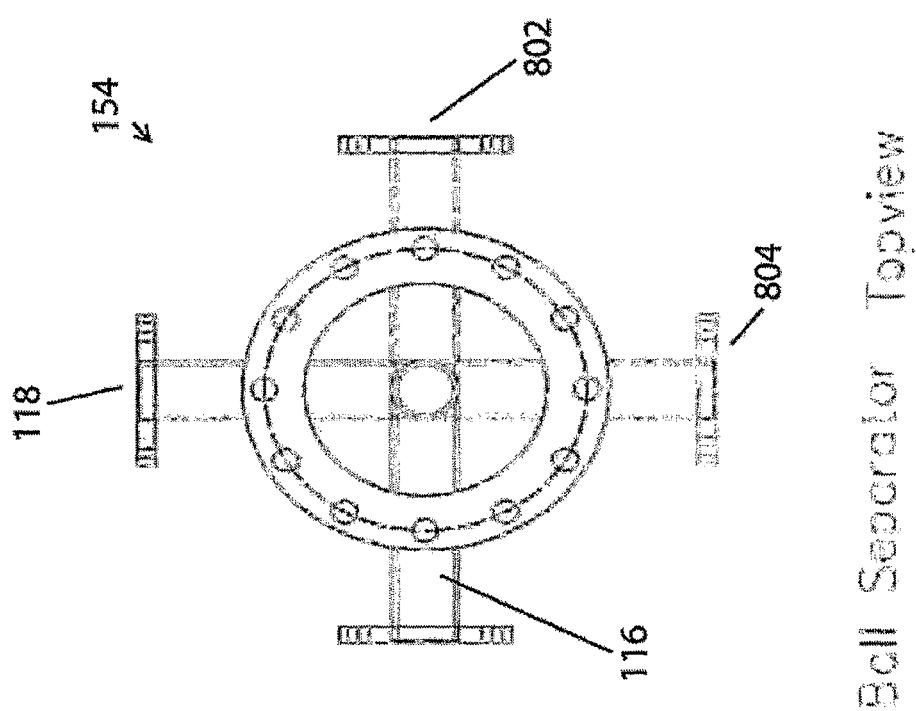
FIG. 8 shows a top view of an outlet pipe portion according to one embodiment of the present invention.

FIG. 8 shows a top view of the outlet pipe portion 154 of the system 170 of FIG. 1. FIG. 8 illustrates that the fluid return conduit 118 can instead be coupled to the outlet pipe portion 154 at two other positions 802 and 804, relative to the position where cleaning element return conduit 116 is coupled to the outlet pipe portion 154.

FIG. 9 shows the tubing 102 that is to be cleaned by the cleaning elements 112 (see FIGS. 1 to 4). A random distributor 902 is placed upstream of the tubing 102 to be disposed along the inlet pipe 104. The random distributor 902 is activated by the fluid 202 in the inlet pipe 104 flowing towards the tubing 102, where the random distributor 902 distributes more evenly the cleaning elements 112 to each tube of the tubing 102, as opposed to not having the random distributor 902 present. The random distributor 902 increases the probability that the cleaning element 112 enters each tube, regardless of the tube arrangement within the tubing 102. A propeller, an impeller or radially misaligned plates with bent or warped surfaces to divert the cleaning elements in different directions can be used for the random distributor 902.

Each of the FIGS. 10A to 10D is a schematic drawing of an operating position of the valve arrangement 126. For FIGS. 10A to 10D, a motorised three way L-port valve is used for the valve arrangement 126.

Comparing FIGS. 10A to 10D with FIG. 1, the three way valve port 126i is coupled to the fluid supply conduit 114, the three way valve port 126ii is coupled to the fluid return conduit 118 and the three way valve port 126iii is coupled to the receptacle first compartment 108f via the fluid connecting sleeve 128.

In FIG. 10A, the three way valve 126 is in the operating position where the ports 126i and 126iii are simultaneously opened (by establishing a channel between the ports 126i and 126iii), while the port 126ii is closed. In turn, the fluid supply conduit 114 is opened, while the fluid return conduit 118 is closed. Accordingly, the fluid supply loop 206 (see FIG. 2) is established.

In FIG. 10B, the three way valve 126 is in the operating position where the ports 126ii and 126iii are simultaneously opened (by establishing a channel between the ports 126ii and 126iii), while the port 126i is closed. In turn, the fluid return conduit 118 is opened, while the fluid supply conduit 114 is closed. Accordingly, the fluid return loop 406 (see FIG. 4) is established.

In FIG. 10C, the three way valve 126 is in the operating position where the ports 126i and 126iii are simultaneously closed, while the port 126ii is closed. In turn, both the fluid supply conduit 114 and the fluid return conduit 118 are closed.

In FIG. 10D, the three way valve 126 is in the operating position where the ports 126ii and 126iii are simultaneously closed, while the port 126i is opened. There is no fluid flow between the fluid supply conduit 114 and the cleaning element supply conduit 120, and there is no fluid flow between the cleaning element return conduit 116 and the fluid return conduit 118.

The motorised three way valve 126 may be programmed, via the controller 134, to operate in a clockwise direction, i.e. to firstly adopt the position shown in FIG. 10A, followed by FIG. 10B and finally to FIG. 10C. After FIG. 10C, the three way valve 126 will return to the position shown in FIG. 10A.

With reference to FIGS. 1 to 4, the three way valve 126 may use the following program sequence. The three way valve 126 remains in the FIG. 10A position for a duration sufficient (around at least 15 seconds) for the cleaning elements 112 (see FIG. 1) to enter the inlet pipe 104. The three way valve 126 remains in the FIG. 10B position for a duration sufficient (around at least 30 seconds) for the cleaning elements 112 (see FIG. 1) to return into the receptacle second compartment 108s from the cleaning element separator 152. The three way valve 126 remains in the FIG. 10C position to store the cleaning elements 112 (see FIG. 1) in the receptacle second compartment 108s until the next cleaning cycle is repeated (around 15 minutes).

Figure 11:
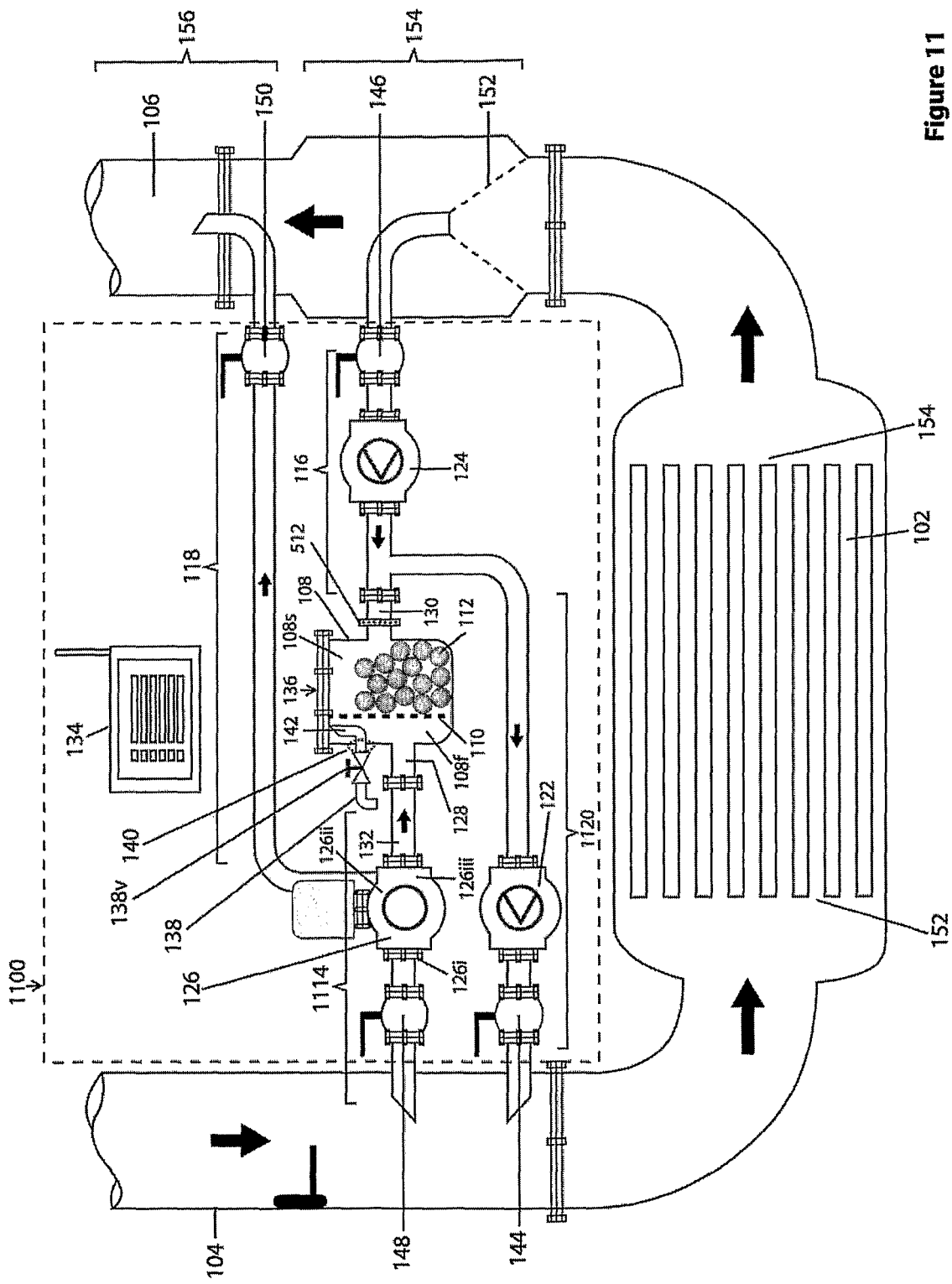
FIG. 11 is a schematic view of a cleaning system according to one embodiment of the present invention.

FIG. 11 is a schematic view of a cleaning system 1100 according to one embodiment of the present invention.

Comparing FIG. 11 with FIGS. 1 to 4, it will be appreciated that 90° elbows need not be present in both the portion of a fluid supply conduit 1114 within the inlet pipe 104 and the portion of the cleaning element supply conduit 1120 that is within the inlet pipe 104. The tapered end surface of the fluid supply conduit 1114 faces downstream fluid flow in the inlet pipe 104, while the tapered end surface of the cleaning element supply conduit 1120 faces away from downstream fluid flow in the inlet pipe 104.

Returning to FIGS. 1 to 4, ball-shaped sponge or a spherical object with bristles may be used as the cleaning elements 112. The ball-shaped sponge or the spherical object should preferably have a diameter equal or slightly larger than the diameter of each tube in the tubing 102. Irregularly shaped sponge with a size larger than that of the diameter of each tube in the tubing 102 may also be used as the cleaning elements 112. Pipes can be used for the fluid supply conduit 114, the cleaning element supply conduit 120, the fluid return conduit 118 and the cleaning element return conduit 116.

The invention claimed is:

1. A non-motorized cleaning system for cleaning tubing used for conducting fluid therethrough, the tubing being connected between an inlet pipe and an outlet pipe, the non-motorized cleaning system comprising:
   a receptacle;
   an apertured partition disposed within the receptacle and dividing the receptacle into a first compartment and a second compartment, the apertured partition comprising a concaved surface;
   at least one cleaning element disposed in the receptacle second compartment, wherein apertures of the apertured partition having a size allowing the fluid, but not the cleaning element to pass through the apertured partition;
   a fluid supply conduit connected to the receptacle first compartment for establishing fluid communication between the inlet pipe and the receptacle first compartment, the fluid supply conduit comprising a tapered end with a tapered end surface within the inlet pipe;
   a cleaning element supply conduit with a directional valve arranged therein, the cleaning element supply conduit being connected to the receptacle second compartment for establishing fluid communication between the receptacle second compartment and the inlet pipe, the cleaning element supply conduit comprising a tapered end with a tapered end surface within the inlet pipe;
      wherein the fluid supply conduit and the cleaning element supply conduit form a part of a fluid supply loop for supplying the cleaning element from the receptacle second compartment into the tubing via the inlet pipe;
   a cleaning element return conduit with a directional valve arranged therein, the cleaning element return conduit comprising an outlet portion being connected to the receptacle second compartment for establishing fluid communication between the outlet pipe and the receptacle second compartment,
   a fluid return conduit comprising an inlet portion being connected to the receptacle first compartment for establishing fluid communication between the receptacle first compartment and the outlet pipe, the fluid return conduit comprising a tapered end with a tapered end surface within the outlet pipe;
      wherein the cleaning element return conduit and the fluid return conduit form a part of a fluid return loop for returning the cleaning element from the tubing via the outlet pipe into the receptacle second compartment; and
   a valve arrangement operable to open/close the fluid supply loop and operable to open/close the fluid return loop;
   wherein the inlet portion of the fluid return conduit is radially misaligned relative to the outlet portion of the cleaning element return conduit, wherein a longitudinal axis of the outlet portion of the cleaning element return conduit forms an angle with a longitudinal axis of the inlet portion of the fluid return conduit, wherein the longitudinal axis of the inlet portion of the fluid return conduit is substantially perpendicular to the apertured partition, wherein the concaved surface of the apertured partition faces the outlet portion of the cleaning element return conduit;
   wherein the tapered end surface of the fluid supply conduit faces downstream fluid flow in the inlet pipe, the tapered end surface of the cleaning element supply conduit faces away from downstream fluid flow in the inlet pipe, and the tapered end surface of the fluid return conduit faces away from downstream fluid flow in the outlet pipe.

2. The non-motorized cleaning system of claim 1, wherein the valve arrangement is a three way valve with three ports, wherein the receptacle first compartment, the fluid supply conduit and the fluid return conduit are each connected to a respective port of the three way valve, wherein the three way valve is also operable to close both the fluid supply conduit and the fluid return conduit simultaneously.

3. The non-motorized cleaning system of claim 1, further comprising a controller to control operation of the valve arrangement.

4. The non-motorized cleaning system of claim 1, wherein the apertured partition extends generally vertically in the receptacle.

5. The non-motorized cleaning system of claim 1, further comprising a pressure relief device coupled to an opening in an outer wall of the receptacle, the pressure relief device operable to release pressure from the receptacle.

6. The non-motorized cleaning system of claim 5, wherein the opening is formed in a top of the outer wall of the receptacle, and the pressure relief device comprises a valve coupled to the opening, the valve being operable to release trapped air pockets formed within the receptacle.

7. The non-motorized cleaning system of claim 5, wherein the pressure relief device further comprises a tube extending from the pressure relief device through the opening in the receptacle side wall into the receptacle, with the tube free end arranged in close proximity to the interior surface of the top wall of the receptacle; and a valve is coupled to the portion of the tube outside the receptacle, the valve being further operable to release trapped air pockets formed within the receptacle.

8. The non-motorized cleaning system of claim 7, wherein the tube free end is tapered, wherein a plane defined by the tapered tube free end surface forms an angle of around 20 degrees to around 70 degrees relative to a longitudinal axis of the tube free end.

9. The non-motorized cleaning system of claim 5, wherein the opening is in a part of the outer wall of the receptacle adjacent to the receptacle first compartment.

10. The non-motorized cleaning system of claim 1, wherein at least a portion of a top of an outer wall of the receptacle is a transparent cover allowing view of an interior of the receptacle.

11. The non-motorized cleaning system of claim 1, wherein a longitudinal axis of the inlet portion of the fluid return conduit forms an angle of around 90° to around 180° with the longitudinal axis of the outlet portion of the cleaning element return conduit.

12. A system comprising
   a tubing with an inlet and an outlet;
   an inlet pipe connected to the tubing inlet;
   an outlet pipe connected to tubing outlet; and a non-motorized cleaning system according to claim 11, wherein the fluid supply conduit and the cleaning element supply conduit are both coupled to the inlet pipe, the fluid supply conduit coupled at a position further upstream than the cleaning element supply conduit to provide a higher pressure at the fluid supply conduit than at the cleaning element supply conduit, wherein the cleaning element return conduit and the fluid return conduit are both coupled to the outlet pipe, the cross-sectional area of the outlet pipe portion where the cleaning element return conduit is coupled being larger than at the outlet pipe portion where the fluid return conduit is coupled to provide a higher pressure at the cleaning element return conduit than at the fluid return conduit, and further comprising a cleaning element separator within the outlet pipe portion with the larger cross-sectional area.

13. The non-motorized cleaning system of claim 1, further comprising a cleaning element separator designed to be placed in the outlet pipe and collect the cleaning element therefrom, wherein the cleaning element separator has apertures having a size allowing the fluid, but not the cleaning element to pass through the apertures, and is coupled to the cleaning element return conduit.

14. The non-motorized cleaning system of claim 1, wherein a plane defined by the tapered end surface of the fluid supply conduit forms an angle of around 20 degrees to around 80 degrees relative to a longitudinal axis of the fluid supply conduit.

15. The non-motorized cleaning system of claim 1, wherein a plane defined by the tapered end surface of the cleaning element supply conduit forms an angle of around 20 degrees to around 80 degrees relative to a longitudinal axis of the cleaning element supply conduit.

16. The non-motorized cleaning system of claim 1, wherein a plane defined by the tapered end surface of the fluid return conduit forms an angle of around 20 degrees to around 80 degrees relative to a longitudinal axis of the fluid return conduit.

\* \* \* \* \*